G. B. DEAN.
Assignor of one-half to J. Y. BURNETT.
MACHINE FOR CUTTING CORN.
No. 10,880. Reissued Nov. 8, 1887.
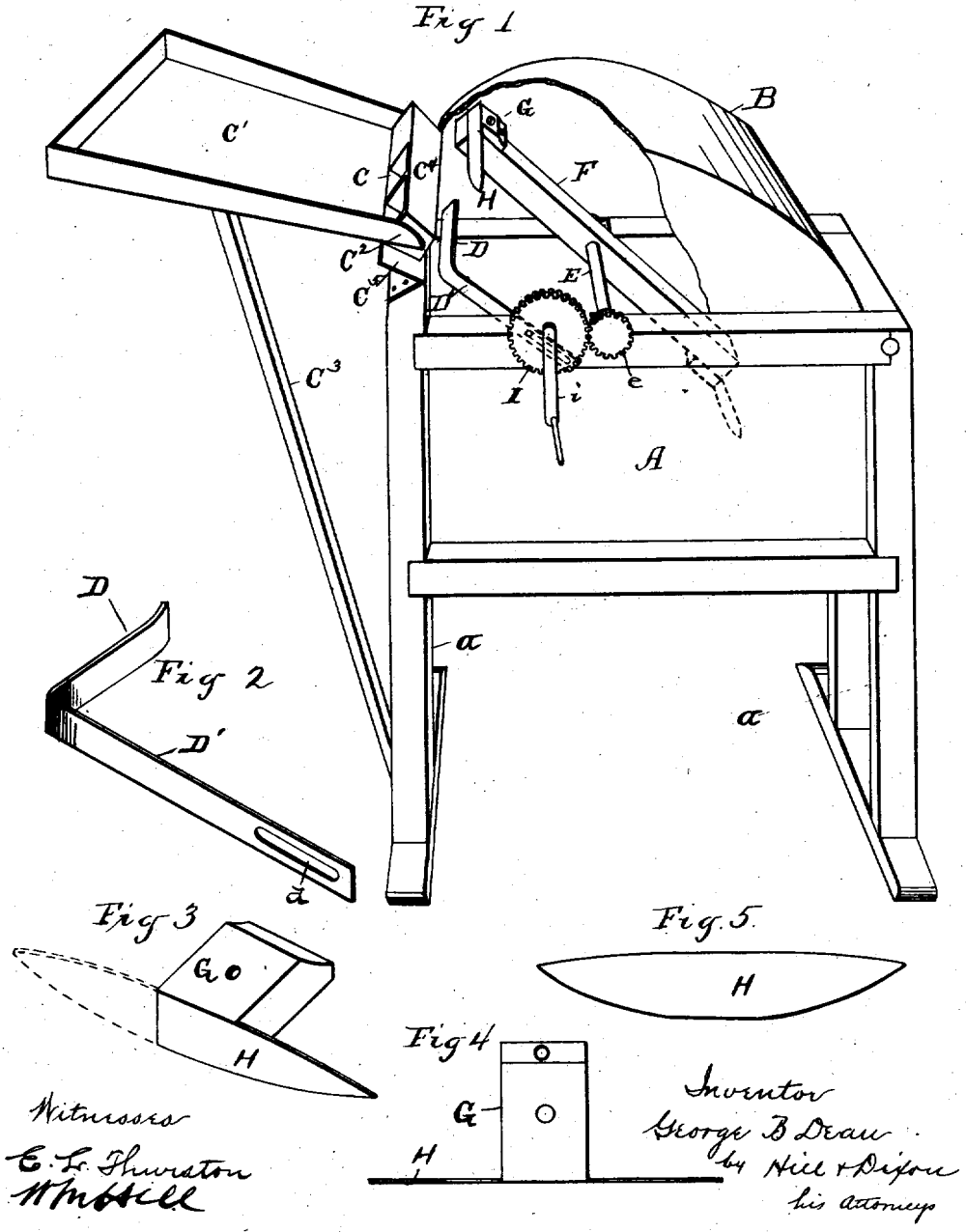
Witnesses
E. L. Thurston
W M Hill
Inventor
George B Dean
by Hill & Dixon
his attorneys
N. PETERS, Photo-Lithographer, Washington, D. C.

UNITED STATES PATENT OFFICE.

GEORGE B. DEAN, OF LAMOILLE, ILLINOIS, ASSIGNOR OF ONE-HALF TO JEREMIAH Y. BURNETT, OF SAME PLACE.

MACHINE FOR CUTTING CORN.

SPECIFICATION forming part of Reissued Letters Patent No. 10,880, dated November 8, 1887.

Original No. 309,773, dated December 23, 1884. Application for re'ssue filed December 21, 1886. Serial No. 222,325.

*To all whom it may concern:*

Be it known that I, GEORGE B. DEAN, of Lamoille, in the county of Bureau and State of Illinois, have invented certain new and useful Improvements in Machines for Cutting Corn, of which the following is a description, reference being had to the accompanying drawings and the letters and figures of reference marked thereon, which form a part of this specification.

This invention relates to machines for cutting corn in the ear; and it consists in the novel construction, combination, and arrangement of the several parts, as will be hereinafter more fully described and claimed.

In the drawings, Figure 1 is a perspective view of my machine, the hood or cover being broken away to show the operating parts. Fig. 2 is a detail view of the stop. Fig. 3 is a detail view of the weight and knife. Fig. 4 shows the weight provided with a different form of knife, and Fig. 5 is a detail view of the knife shown in Fig. 4.

To carry my invention into effect I employ a suitable supporting-frame consisting, preferably, of the box or casing A, mounted on legs *a*, and provided with a hood or cover, B, which incloses the cutting devices. The framing is provided at one end with feed-passages C, inclined downward toward their inner ends and preferably formed through a casting, $C^4$, fixed to the framing and provided with lateral wings $C^5$, projecting from its lower side. A stop, D, is arranged within the casing, and, as shown, is secured thereto by a bolt or set-screw, which passes through the shank D′. This shank is provided near its end with a slot, *d*, through which the retaining-screw passes. This stop, it will be seen, is arranged in front of and at right angles to the feed-passages C. By means of the slotted shank D′ the stop may be adjusted to and from the inner ends of said feed-passages to vary the size of the cuttings, as will obviously appear. A shaft, E, is journaled on the frame at right angles to the feed-passages C and parallel to the stop D. A series of rotating knives, H, are mounted on said shaft, preferably by securing them at the ends of the arm F, which is keyed or otherwise rigidly secured to the said shaft. These knives lie parallel to the shaft E, and in rotating pass close to the ends of the feed-passages C and between them and the stop D. It is desirable, in order that the knives shall have a regular and continuous motion and the machine be more easily operated, that the arm to which they are attached be weighted or balanced, on the principle of a fly-wheel, to increase the centrifugal force. For simplicity and economy I prefer to produce this effect by securing the weights G to the outer ends of said arm or cutter-bar F, and, if desired, the knives H and weights may be in one piece, as shown, and applied to the ends of the arm F.

In Figs. 4 and 5 I have shown the knife extended on both sides of the weight. Where so desired, this construction may be used. This, it will be seen, would involve the necessity of a separate stop, D, on each side of the cutter-bar.

The shaft E may be provided with a pulley or crank and driven by steam, horse, or other power. When fed by self-feeder, the self-feeder will be elevators driven by pulley on shaft E; but when intended for use by hand I preferably provide it with a pinion, *e*, meshed with a drive-gear, I, having a suitable crank-handle, *i*. By this construction the shaft may be rapidly and easily driven, and by arranging the drive-gear on the side toward the feed-passages C the operator may readily feed with one hand and drive the shaft with the other.

The feed-table is preferably removably secured by the ears $C^2$, which extend on opposite sides of the casting $C^4$, resting on the wings $C^5$, and is supported by a standard, $C^3$, as shown. I intend this especially for use when the machine is driven by the operator with one hand on the driving-crank and the other hand feeding the machine, in which case the table holds the ears of corn in a convenient manner for feeding the same.

The operation of the machine is simple, and will be fully understood from the description before given. The ears of corn inserted one through each of the feed-passages rest against the stop D. When a piece is cut off by the knife, the shortened ear drops against the stop, and so on until the ear is entirely cut up.

It is obvious that the bar might be provided at one end only with the cutters, or might extend on one side of the shaft only; but I prefer the construction shown and before described.

Having thus described the invention, what I claim, and desire to secure by Letters Patent, is—

1. In a corn-cutter, the combination of the frame, the casting $C^4$, provided with feed-passages C, and lateral wings $C^5$, the cutter-bar provided with knives operating close to the inner ends of the feed-passages, and the removable feed-table having ears $C^2$, fitted detachably on opposite sides of the casting $C^4$, and a standard or upright, $C^3$, substantially as set forth.

2. The combination, in a corn-cutting machine, of the framing provided with the feed-passages C, the shaft E, arranged at right angles to the said feed-passages, the bar secured on said shaft and having knives projecting at right angles from its outer ends and arranged to cut close to the inner ends of the feed-passages, and counterpoising weights secured on the outer end of said bar, substantially as set forth.

3. In a corn-cutting machine, the combination of the framing, the casting $C^4$, mounted on one end thereof, and provided with passages C and lateral wings $C^5$, the shaft E, journaled in the frame at right angles to the feed-passages C, the bar F, secured on the shaft E and provided on its ends with right-angled knives arranged to cut close to the inner ends of the feed-passages, the stop D, provided with right-angled arm D′, secured adjustably to the framing, the table C′, having ears $C^2$ fitted removably on opposite sides of the casting $C^4$ and resting on the wings $C^5$, and the standard or upright $C^3$, substantially as set forth.

4. In a corn-cutter, the combination of a suitable frame provided at one end with feed-passages, a rotating shaft lying at right angles to said feed-passages and journaled in the frame, and knives secured to said shaft and lying parallel thereto and arranged to cut close to the inner ends of the feed-passages, with a bent stop having a slotted shank and a set-screw which passes through said slot and adjustably secures the stop to the frame and in front of the feed-passages, substantially as and for the purpose specified.

5. In a corn-cutter, the combination of the frame provided at one end with feed-passages, a revolving shaft lying at right angles to said feed-passages and journaled in the frame, an arm secured to said shaft, knives secured to said arm, and counterpoising weights secured to said arm, with a stop arranged in front of said feed-passages, substantially as and for the purpose specified.

GEO. B. DEAN.

Witnesses:
E. L. THURSTON,
T. S. E. DIXON.